UNITED STATES PATENT OFFICE.

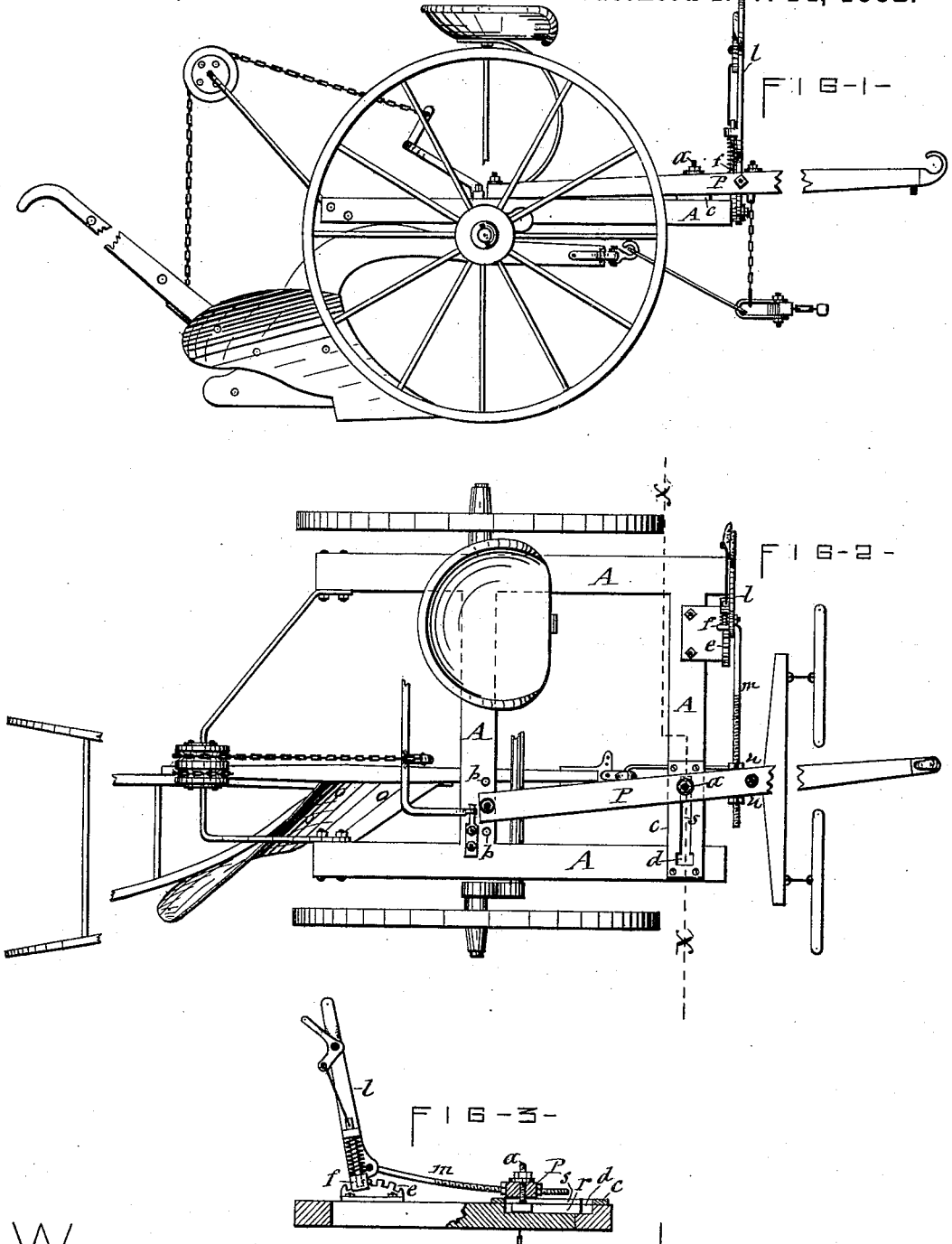

DENNIS P. SHARP, OF ITHACA, NEW YORK, ASSIGNOR TO CHARLES M. SHARP AND CLARENCE C. POST, OF SAME PLACE.

PLOW-SULKY.

SPECIFICATION forming part of Letters Patent No. 267,602, dated November 14, 1882.

Application filed August 23, 1882. (No model.)

*To all whom it may concern:*

Be it known that I, DENNIS P. SHARP, of Ithaca, in the county of Tompkins, in the State of New York, have invented new and useful Improvements in Plow-Sulkies, of which the following, taken in connection with the accompanying drawings, is a full, clear, and exact description.

This invention relates to the adjustment of the tongue of a sulky-plow for the purpose of guiding the plow so as to take more or less land, as may be desired, the invention consisting in an improved construction of the connection of the tongue with the sulky-frame, said improvement affording greater range of adjustment, and also admitting of a ready attachment and detachment of the tongue, all as hereinafter more fully described, and specifically set forth in the claim.

Referring to the annexed drawings, Figure 1 is a side view of the sulky-plow provided with my improvement. Fig. 2 is a plan view of the same, and Fig. 3 is a transverse section on line $x\ x$.

Similar letters of reference indicate corresponding parts.

A represents the sulky-plow frame, mounted on two wheels, and carrying between said wheels the plow in the usual manner.

P denotes the tongue or pole by means of which the horses hitched to the plow guide the sulky. This pole I pivot on the central cross-beam of the sulky-frame at a point nearly or quite in line with the axis of the carrying-wheels of the sulky, said cross-beam being for that purpose provided with two or more holes, $b\ b$, arranged as aforesaid, and the rear end of the pole P is connected thereto by a bolt passing through the pole and through one of the holes $b$, according to the angle required of the pole in relation to the line of draft, as hereinafter more fully explained. The forward portion of the pole rests on the front end of the sulky-frame, and is connected thereto and adjustable laterally by a bolt, $a$, secured in a suspended position on the pole, and extending through a slot, $s$, in a plate, $c$, which is rigidly secured to the top of the forward cross-bar of the sulky-frame, said cross-bar being provided with a recess, $r$, underneath the plate $c$, for the reception of the head of the bolt $a$, which, by its engagement with the underside of the plate, couples the forward part of the sulky-frame with the pole P. The outer end of the slot $s$ terminates with an enlarged opening, $d$, in the plate $c$, which opening allows the head of the bolt to pass through it in attaching and detaching the pole.

$e$ is a semicircular ratchet attached to the front cross-bar of the sulky-frame some distance from the aforesaid connection of the pole. To the side of the ratchet is pivoted a lever, $l$, which is adjustably connected with the pole P by a rod, $m$, which passes through the pole, and is provided at opposite sides thereof with nuts $n\ n$, by means of which the pole can be moved on the rod $m$, so as to lengthen or shorten the distance between the pole and lever, and thus vary correspondingly the side-thrust transmitted from the latter to the former. To the side of said lever is connected a spring-dog, $f$, adapted to engage the ratchet $e$. By means of the lever $l$ the pole P can be swung laterally, so as to stand at different angles to the line of draft, and the ratchet $e$ and dog $f$ serve to retain the pole in the desired position. The angle in the position of the pole can be further increased by shifting the rear end of the pole from one hole $b$ to another.

It will be observed that by throwing the forward end of the pole outward from the line of draft, or away from the land side of the furrow in process of being plowed, the lower carrying-wheel of the sulky is crowded toward the land side of the furrow in which it travels, thereby overcoming the tendency of the sulky working down the hillside and carrying the plow out of its proper course.

In the annexed drawings the pole is shown in the opposite position from that before described, for the purpose of illustrating the form of the slot $s$, with its enlarged end opening, $d$.

I do not claim broadly the arrangement of the tongue connected adjustably laterally on the sulky-frame, as I am aware the same is not new; but What I do claim as new, and desire to secure by Letters Patent, is—

The combination of the sulky-frame A, provided at its central portion with two or more holes, $b$, and at its forward end with the recess $r$, the plate $c$ over said recess, provided with the slot $s$, terminating with enlarged opening $d$, the pole P, pivoted in one of the holes $b$, the bolt $a$, connected to the pole and passing through the slot $s$, and having its head underneath the plate $c$, and the shifting-lever $l$, connected with the pole by adjusting-nuts $n\ n$, and provided with a suitable clutch for adjustably holding it in position, substantially as shown and described.

In testimony whereof I have hereunto signed my name and affixed my seal, in the presence of two attesting witnesses, at Syracuse, in the county of Onondaga, in the State of New York, this 9th day of August, 1882.

DENNIS P. SHARP. [L. S.]

Witnesses:
WM. C. RAYMOND,
F. H. GIBBS.